United States Patent [19]

Digele

[11] Patent Number: 4,817,774

[45] Date of Patent: Apr. 4, 1989

[54] FLUID FRICTION CLUTCH

[75] Inventor: Joerg Digele, Freiberg, Fed. Rep. of Germany

[73] Assignee: Sueddeutsche Kuehlertabrik Julius Fr. Behr GmbH & Co., Fed. Rep. of Germany

[21] Appl. No.: 188,664

[22] Filed: Apr. 25, 1988

Related U.S. Application Data

[63] Continuation of Ser. No. 911,669, Sep. 25, 1986, abandoned.

[30] Foreign Application Priority Data

Oct. 12, 1985 [DE] Fed. Rep. of Germany ....... 3536456

[51] Int. Cl.⁴ .............................................. F16D 35/00
[52] U.S. Cl. .................................. 192/58 B; 192/82 T
[58] Field of Search ............................ 192/58 B, 82 T

[56] References Cited

U.S. PATENT DOCUMENTS

| 2,792,095 | 5/1957 | Sherman | 192/58 B |
|---|---|---|---|
| 3,559,785 | 2/1971 | Weir | 192/58 B |
| 3,840,101 | 10/1974 | Peter et al. | 192/58 B |
| 3,910,391 | 10/1975 | Detty et al. | 192/58 B |
| 3,983,980 | 10/1976 | Weintz | 192/58 B |
| 3,990,556 | 11/1976 | Hayashi et al. | 192/58 B |
| 4,134,484 | 1/1979 | Lansinger | 192/58 B |
| 4,266,645 | 5/1981 | Crooks | 192/58 B |
| 4,485,902 | 12/1984 | Storz | 192/58 B |
| 4,597,672 | 7/1986 | Neier et al. | 366/186 |
| 4,618,045 | 10/1986 | Storz | 192/58 B |

FOREIGN PATENT DOCUMENTS

| 2219326 | 11/1973 | Fed. Rep. of Germany . | |
| 2353461 | 5/1975 | Fed. Rep. of Germany . | |
| 2364234 | 7/1975 | Fed. Rep. of Germany . | |
| 2439256 | 2/1976 | Fed. Rep. of Germany | 192/58 B |
| 2837636 | 3/1980 | Fed. Rep. of Germany . | |
| 3041829 | 5/1982 | Fed. Rep. of Germany . | |
| 1276097 | 10/1960 | France . | |
| 1829 | 1/1982 | Japan | 192/58 B |

Primary Examiner—Rodney H. Bonck
Assistant Examiner—Richard M. Lorence
Attorney, Agent, or Firm—Barnes & Thornburg

[57] ABSTRACT

A fluid friction clutch is provided having a disk and a housing concentrically surrounding the disk, with a working gap formed between the housing and the disk. The housing has a collecting channel for return of clutch fluid from the working gap to a storage chamber. Clutch fluid flows to the collecting channel due to the arrangement of grooves located in axially adjacent groove sections. The collecting channel is axially interposed between the groove sections, and the grooves are sloped so that the clutch fluid flows towards the collecting channel.

9 Claims, 3 Drawing Sheets

FLUID FRICTION CLUTCH

This application is a continuation of application Ser. No. 911,669, filed Sept. 25, 1986 now abandoned.

BACKGROUND AND SUMMARY OF THE INVENTION

The present invention relates to a fluid friction clutch having a pot-shaped disk and a housing surrounding the pot disk (pot disk) while forming a working gap, the housing being pivotable with respect to the pot disk. At the wall of the housing opposite the circumference of the pot disk is a collecting groove for the return of clutch fluid from the work space into a storage chamber that is disposed axially in front of the work space. The collecting groove, via a controllable opening for the feeding of the clutch fluid, is connected with the work space, thread-type grooves for the feeding of the clutch fluid to the collecting groove being provided between the circumference of the pot disk and the adjacent housing.

A fluid friction clutch of the above-described type is shown in German Published Unexamined Patent Application No. 3,041,829. In the shown construction, the collecting groove is arranged at the end of the circumference of a pot disk facing the storage chamber and, via a retaining body projecting into it and having a connecting channel, is connected to the storage chamber. The thread-type grooves have such a slope that, when the pot disk is turned, the fluid located in the working gap between the housing and the circumference of the pot disk is transported to the collecting groove. The fluid is dammed up in this groove by the retaining body and is effectively returned into the storage chamber. The feeding of the clutch fluid into the work space takes place by means of a preferably temperature-dependently actuated valve lever that opens or closes an opening in the partition between the storage chamber and the work space.

A certain disadvantage of these constructions is the relatively costly manufacturing of the retaining body and its fitting into the collecting groove and into the housing. The tolerances that must be maintained for this purpose increase the manufacturing expenditures. For some uses, the switching behavior of the clutch is also too abrupt. The reason is that this type of construction causes a fast connecting and disconnecting of the clutch, which in some cases should be replaced by a more slowly connecting and disconnecting and thus more slowly operating clutch.

An object of the present invention is to provide a clutch of the initially mentioned type with an improved control behavior and especially a softer connecting and disconnecting.

This and other objects are achieved by providing in a fluid friction clutch of the initially mentioned type, a collecting channel disposed between groove sections that are axially adjacent on both sides of the channel and are sloped in opposite directions. By this development, clutch fluid, due to the relative rotation between the housing and the pot disk, and because of hydrodynamic phenomena, is transported to the collecting channel. As a result, a pressure rise is generated in the channel that is sufficient for causing the desired return of fluid into the storage chamber without having to provide a retaining body.

Opposed thread grooves at the circumference of a clutch disk of a fluid friction clutch are shown in U.S. Pat. No. 4,266,645. However, in that reference, the grooves are used only for distributing clutch fluid from a central feeding channel in the direction toward the ends of the circumference of the clutch disk and to transport it in the circulating system, and not for collecting clutch fluid and returning it into a storage chamber. That this is possible in an elegant manner and results in a number of advantages, is a finding of the present invention.

In a preferred embodiment of the present invention, the sections with the grooves are provided at the circumference of the pot disk and a recess is provided between these sections that forms a projection for the manufacturing tool for the grooves. If the collecting channel is placed in the center of the pot disk between equally large axial sections having grooves, and if the extent of the slope of the two opposed threads are equally large, a maximum pressure is generated in the collecting groove.

The arrangement of the sections having the thread-type grooves on the pot disk has advantages with respect to manufacturing technology. Additional tolerances for the installation of retaining bodies are not required. It is also contemplated, however, for the grooves to be provided at the interior wall of the housing. The pot disk may then, in a simple way, be developed as a deep-drawn part.

The new fluid friction clutch also has the advantage that it can operate with significantly less clutch fluid. This is a result of the fact that, because of the arrangement of the collecting channel in the center of the working gap, even the smallest amounts of oil are forced through a part of the working gap before they are pumped out again. The clutch therefore reacts to small amounts of clutch fluid which results in a soft connecting and disconnecting of the clutch. Because of this finely proportioned feeding of oil, stable intermediate speeds can also be maintained.

A further feature of preferred embodiments is that the return channel may also, in a very simple way, be provided in the housing. Since this can be cast, the return channel originating from the collecting channel may also be cast in so that a cutting process and a subsequent cleaning from chips is not required.

Further objects, features, and advantages of the present invention will become more apparent from the following description when taken with the accompanying drawings which show, for purposes of illustration only, an embodiment in accordance with the present invention.

DETAILED DESCRIPTION OF THE DRAWINGS

Figure 1:
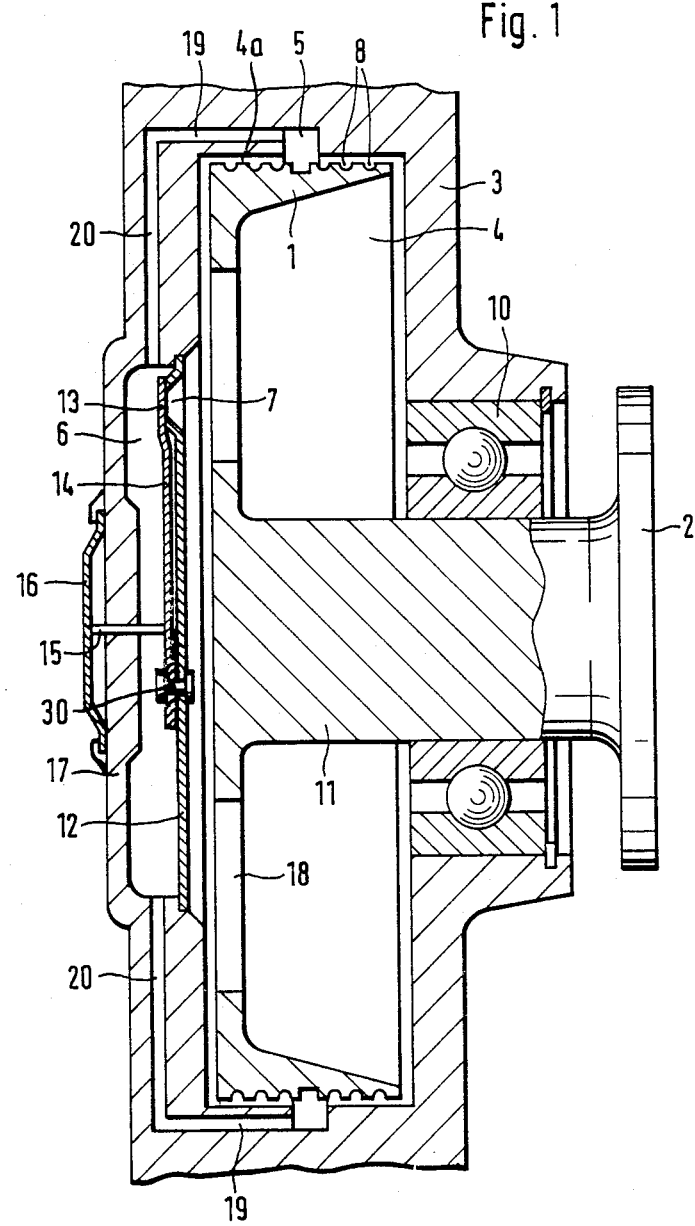
FIG. 1 is a diagrammatic longitudinal section through a fluid friction clutch constructed in accordance with preferred embodiments of the present invention.
Figure 2:
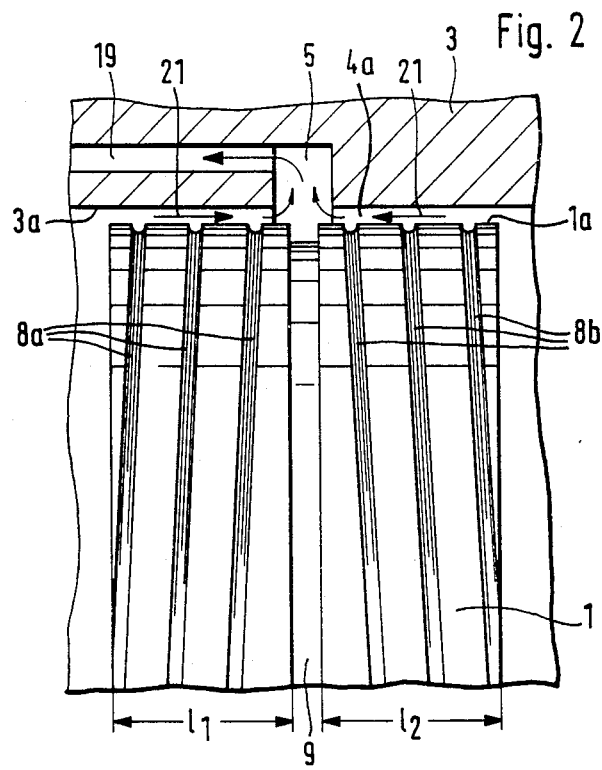
FIG. 2 is an enlarged detail of a circumferential area of the clutch of FIG. 1.

In FIGS. 1 and 2, a pot disk 1 is arranged in a housing 3 such that it can be rotated via the ball bearings 10. The pot disk 1 is a primary part and has a central shaft 11 equipped with a flange 2 that may, for example, be coupled with a drive. The housing 3, rotatable with respect to the pot disk 1, serves as the secondary part. The housing 3 has a working space 4 into which the pot disk 1 is inserted such that at least with its circumference 1a, it forms a working gap 4a with the interior wall 3a of the housing. During relative rotation between the pot disk 1 and the housing 3, via clutch fluid located in the work space 4 and in the working gap 4a, by means of fluid friction, the input driving force can be transferred to the output part. If therefore the pot disk 1 is the driven part, the housing 3 is taken along by means of fluid friction. The housing 3, for example, can be equipped with the blades of an axial fan for the radiator of a motor vehicle engine.

When the clutch is disconnected, clutch fluid is located essentially in a storage chamber 6 disposed axially in front of the working space 4 in the housing 3 and is separated from the working space 4 by means of a partition 12. An opening 7 is provided in the partition that can be closed or opened by a valve part 13 that is located at the free end of a spring lever 14 that, by means of the rivet 30, is mounted firmly at the partition 12. The spring lever 14 is biased to lift itself and the valve part 13 from the opening 7, but in the illustrated embodiment, is swivelled clockwise via an actuating bolt 15 that penetrates the cover 17 of the housing 3 and is acted upon by a bimetallic strip 16. The swivelling motion of the lever 14 and thus the opening-up or closing of the opening 7 can therefore be controlled temperature-dependently by the bimetallic strip 16. After flowing through the opening 7, the clutch fluid penetrates the openings 18 in the radially extending part of the pot disk 1 and enters into the working space 4 and also into the radial working gap 4a between the circumference 1a of the pot disk 1 and the interior wall 3a of the housing 3.

The return of the clutch fluid into the storage chamber takes place via collecting channel 5 in the housing 3. The collecting channel 5 is connected, via two or several axially extending connecting channels 19 evenly distributed on the housing circumference, and radial channels 20, to the storage chamber 6. In order to assure that the clutch fluid reaches the collecting channel 5, two sections $L_1$, $L_2$ having grooves 8a, 8b are provided, as shown particularly in FIG. 2, at the circumference 1a of the pot disk 1 and each extend over the same axial length. The thread-like grooves 8a, 8b have opposed but equally large slopes. In the center between the two sections $L_1$ and $L_2$, a recess 9 is provided in the circumference 1a of the pot disk 1 into which the respective thread-type grooves lead from both sides. This recess 9 is radially opposite the collecting channel 5.

The thread-type grooves in sections $L_1$ and $L_2$ causes the clutch fluid, when the pot disk 1 is rotated relative to the housing 3, to move from the direction of both sides of the pot disk 1 in the direction of the Arrows 21 to the central collecting channel 5. The direction of rotation of the pot disk 1 depends on the inclination of the grooves 8a and 8b to cause the fluid to flow towards the collecting channel 5. With the inclination of the grooves 8a and 8b seen in FIG. 2, this rotation is out of the plane of the drawing. The clutch fluid is therefore dammed up in the collecting channel 5 by the rotation-caused transporting effect of the grooves 8a and 8b, and by means of the increased pressure is transported into the return channels 19, 20 to the storage chamber 6. Additional measures for returning the clutch fluid are not required.

A clutch constructed in accordance with the present invention can be operated with much less clutch fluid. It was found, for example, that when silicon fluid was used as the clutch fluid, the amount of clutch fluid could be reduced by about half compared to a conventional fluid friction clutch having retaining bodies, with equally effective performance.

Figure 3:
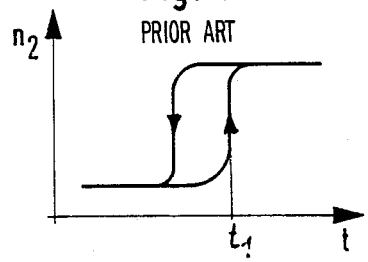
FIG. 3 is a diagrammatic representation of the switching hysteresis of a prior art fluid friction clutch.
Figure 4:
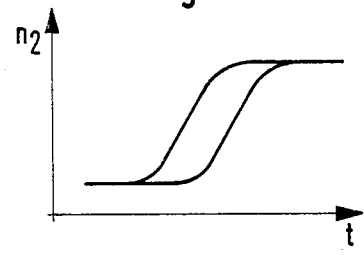
FIG. 4 is the analogous representation of the switching hysteresis for the fluid friction clutch of FIG. 1.

For purposes of comparison, FIGS. 3 and 4 show the switching hystereses of a clutch of the prior art construction and the present invention. FIG. 3 shows that prior art clutches at a certain point in time $t_1$, connect relatively abruptly and have similar behavior also at the time of the disconnecting. The clutch constructed in accordance with preferred embodiments of the present invention, in contrast, exhibits a soft connecting and disconnecting of the clutch which is desirable for a number of uses. This switching hysteresis is caused by the fact that clutch fluid is always transported through a part of the working space. Consequently, intermediate speeds can also be maintained well.

It is also contemplated to develop the axial sections $L_1$ and $L_2$ having the thread grooves 8a, 8b differently with respect to their axial course as well as with respect to the type of their grooves and the slope of their grooves. However, the embodiment that is symmetrical with respect to the recess 9 was found to be especially advantageous and practical, and also from the point of view of manufacturing technology.

Figure 5:
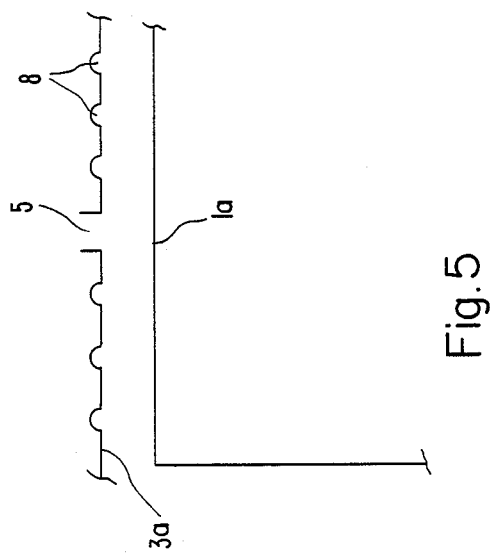
FIG. 5 is a diagrammatic representation of an alternative embodiment of the fluid friction clutch.

It is also contemplated to increase the idling speed by reducing the efficiency of the transporting grooves. Further, it is contemplated to provide the transport grooves at the interior circumference 3a of the housing 3, and to develop the pot disk as a deep-drawn part having a cylindrical circumference as shown in FIG. 5.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed is:
1. A fluid friction clutch comprising:
a disk,
a housing concentrically surrounding the disk, said housing and disk being rotatable with respect to one another with a working gap formed between the housing and disk for accommodating clutch fluid which transfers forces between said housing and disk,
a clutch fluid storage chamber separated from the working gap by a partition wall having clutch fluid opening means to the working gap,
temperature responsive valve means for controlling the clutch fluid opening means,
collecting channel means separate from the clutch fluid opening means for returning clutch fluid from the working gap to the storage chamber in bypassing relation to the clutch fluid opening means along a flow path other than through the clutch fluid opening means during relative rotation of the disk and housing, and return flow groove means formed in at least one of the disk and housing, said return flow groove means including two sections axially spaced from one another at opposite sides of a return opening to the collecting channel means with said grooves being sloped oppositely in each of the respective groove sections and being configured to induce clutch fluid flow toward the return opening during relative rotation of the disk and housing.

2. A fluid friction clutch according to claim 1, wherein the disk is a pot disk.

3. The fluid friction clutch according to claim 1, wherein said grooves are provided on the circumference of said disk.

4. A fluid friction clutch according to claim 3, further including a recess section on said disk axially interposed between said groove sections, said recess section forming a portion of said return opening.

5. A fluid friction clutch according to claim 4, wherein said groove sections have equal axial lengths.

6. A fluid friction clutch according to claim 5, wherein the extent of the slopes of the grooves in said groove sections are equal.

7. A fluid friction clutch according to claim 6, wherein said recess section is axially centered between said groove sections.

8. A fluid friction clutch according to claim 1, wherein said groove sections are on an interior wall of said housing, and said disk has a smooth outer wall.

9. A fluid friction clutch according to claim 8, wherein the disk is a pot disk.

* * * * *

UNITED STATES PATENT AND TRADEMARK OFFICE
CERTIFICATE OF CORRECTION

PATENT NO. : 4,817,774
DATED : April 4, 1989
INVENTOR(S) : Jorg Digele

It is certified that error appears in the above-identified patent and that said Letters Patent is hereby corrected as shown below:

Title page:

Item [73] should read: Sueddeutsche Kuhlerfabrik Julius Fr. Behr GmbH & Co. KG

Signed and Sealed this

Twenty-sixth Day of June, 1990

Attest:

HARRY F. MANBECK, JR.

*Attesting Officer*     Commissioner of Patents and Trademarks